(12) United States Patent
Karami et al.

(10) Patent No.: US 6,485,091 B2
(45) Date of Patent: Nov. 26, 2002

(54) OPENABLE MOTOR VEHICLE ROOF

(75) Inventors: Malamiri Jadolah Karami, Ottobrunn (DE); Manfred Pfalzgraf, Hersching (DE); Walter Schätzler, Starnberg (DE); Joachim Birkner, Puchheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/785,519

(22) Filed: Feb. 20, 2001

(65) Prior Publication Data

US 2001/0030452 A1 Oct. 18, 2001

(30) Foreign Application Priority Data

Feb. 18, 2000 (DE) .......................... 100 07 472

(51) Int. Cl.$^7$ ................................. B60J 7/047
(52) U.S. Cl. ............................. 296/216.02; 296/220.01
(58) Field of Search ..................... 296/216.02–216.04, 296/220.01

(56) References Cited

U.S. PATENT DOCUMENTS

| | | | | |
|---|---|---|---|---|
| 3,333,889 A | * | 8/1967 | Golde | 296/106 X |
| 4,063,774 A | * | 12/1977 | Hanks | 296/216.04 |
| 4,272,121 A | * | 6/1981 | Kim | 296/216.04 X |
| 4,630,858 A | * | 12/1986 | Bez | 296/216.04 X |
| 4,786,102 A | * | 11/1988 | Sakamoto et al. | 296/218 X |
| 6,158,803 A | * | 12/2000 | Reihl et al. | 296/216.04 |

FOREIGN PATENT DOCUMENTS

| | | | | |
|---|---|---|---|---|
| DE | 43 29 583 | | 10/1994 | |
| DE | 19908253 | * | 9/2000 | |
| EP | 0 531 881 | | 3/1993 | |
| JP | 406191436 | * | 7/1994 | 296/216.04 |

* cited by examiner

*Primary Examiner*—Dennis H. Pedder
(74) *Attorney, Agent, or Firm*—Nixon Peabody LLP; David S. Safran

(57) ABSTRACT

An openable motor vehicle roof with at least two successive, separately openable roof systems, of which the front roof system has at least one cover (4) which can be raised at its rear edge (4D) over the fixed motor vehicle roof (1). The rear roof system is formed by a louvered roof which has a plurality of louver-shaped cover parts of which a rearmost cover part (9) is located over the rear area of a cargo space (28) of the motor vehicle, and which can be opened from back to front, beginning with the rearmost cover part (9). Preferably, the rear edge (9D) of the rear cover part (9) directly adjoins the rear hatch, the rear door, or the rear window (10) of the vehicle.

9 Claims, 4 Drawing Sheets

OPENABLE MOTOR VEHICLE ROOF

BACKGROUND OF THE INVENTION

1. Field of the Invention

The invention relates to an openable motor vehicle roof with at least two successive, separately openable roof systems of which the front roof system comprises at least one cover which can be raised at its rear edge above the fixed motor vehicle roof.

2. Description of Related Art

Published German Patent Application EP 0 531 881 A1 discloses a motor vehicle roof with two covers which are located in succession in a fixed motor vehicle roof. The two covers can be actuated by a single drive, but activation can take place separately for each cover.

Furthermore, motor vehicles are known in which a rear window in a rear hatch can be separately lowered to facilitate access to the rear cargo space of the motor vehicle especially for stowing bulky articles.

German Patent DE 43 29 583 discloses a louvered roof in which the louvers can be opened from back to front in one version.

SUMMARY OF THE INVENTION

The primary object of this invention is to develop an openable motor vehicle roof of the initially mentioned type such that the function of facilitated loading of a cargo space is added to the generous opening possibilities of a motor vehicle roof with several successively arranged roof systems.

This object is achieved by the rear roof system being formed by a louvered roof which having several louver-like cover parts, which is located with its rearmost cover part over the rear area of a cargo space of the motor vehicle and which can be opened from back to front.

It is provided in accordance with the invention that an openable motor vehicle roof has a louvered roof in the rear area which is composed of several louver-like cover parts and that it can be opened from back to front so that it thus clears a large cargo opening in the motor vehicle roof. In front of this louvered roof, there is a front roof system with at least one cover which can be raised at its rear edge to above the fixed motor vehicle roof. This combination of two known roof systems enables the set of louvers which has been pushed together towards the front to be protected from oncoming wind forces while driving by the cover of the front roof system which has been raised at its rear edge.

To simplify loading, it is advantageous if the rear edge of the rear cover part directly adjoins the rear hatch, rear door or rear window of the motor vehicle. Thus, for example, by lowering the rear window into the rear door or the rear hatch with the louvered roof open, a continuous opening can be achieved which comprises the rear roof area and half the height of the rear door. Thus the cargo area is cleared similarly to a pick-up truck for loading from the rear and at the top.

It is especially advantageous if the rear edge of the cover of the front roof system, in the completely raised state, is higher than the opened cover parts of the rear roof system. In this way, the airstream is routed completely over the set of the opened louvered roof. However, this only makes sense when the louvers are sloped obliquely forward and upward toward their front edge when opened. At a conventional angle of the louvers with their rear edge directed rearward and upward, the frontmost raised louver itself acts like a wind deflector for the part of the roof opening which lies behind.

Between the two roof systems there is advantageously a narrow transverse bow or a narrow area of the fixed motor vehicle roof. The stability of the motor vehicle is increased by one such connection between the side members.

One embodiment is especially advantageous in which the front roof system is an externally guided sliding roof with a cover which is supported near its rear edge by support levers which have bottom ends which are supported on sliding elements which can be moved on guides which lie laterally outside the guides for the louver-like cover parts of the rear roof system. The use of an externally guided sliding roof enables comfortable clearance of a large front roof opening as long as the rear louvered roof has not reached a certain degree of opening. The motor vehicle thus has a double: with the front roof system opened, it offers the advantages of a large sliding roof, and with the rear roof system opened it offers generous access to the cargo space, at the same time with the front cover raised there also remaining a ventilation possibility there.

In an alternative embodiment, the front cover is made as the cover of a spoiler roof which with its rear edge can be raised into the ventilator position and in this tilted position can be moved partially over the roof which is located behind. In this case a single continuous guide rail can be advantageously used in which both the cover of the spoiler roof as well as the louvers which lie behind are guided.

In an especially advantageous development, the front and the rear roof system can be driven via separate electric drives which can be triggered by a common control device, such that the cover of the front roof system can be only raised and moved to a limited degree in the lengthwise direction when the rear roof system is closed and has reached a certain partial degree of opening. The control device thus assumes the task of precluding collisions of the roof system. According to one version, it can be provided that the cover of the front roof system is necessarily moved into its raised position as soon as the control device receives a signal for opening the rear roof system at least for a certain partial degree of opening.

Finally, it is advantageous if the front roof system is preceded by a wind deflector louver which is moved into a raised position as soon as the cover of the front roof system has reached at least one certain partial degree of opening. This embodiment also effectively protects the front roof opening with the roof moved at least partially to the rear against the draft and wind noise.

In the following embodiments of the invention are described using the accompanying drawings.

DETAILED DESCRIPTION OF THE INVENTION

Figure 1:
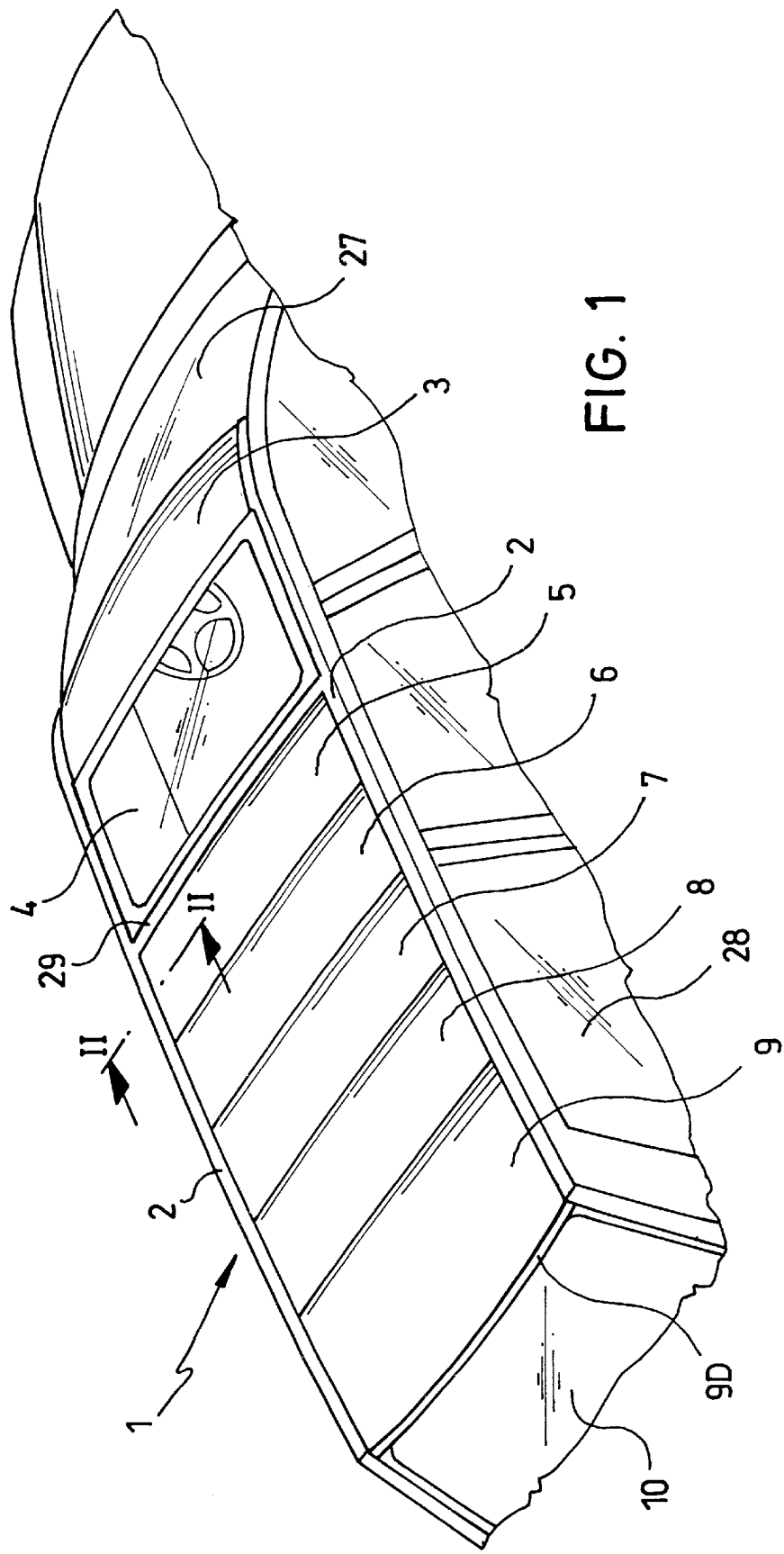
FIG. 1 shows a schematic perspective view of a motor vehicle roof with a front, externally guided sliding roof, a wind deflector louver located in front of it, and a louvered roof which lies behind it.

In the motor vehicle roof 1 shown in FIG. 1, the front window 27 rearwardly adjoins the wind deflector louver 3, rearward of which is a cover 4 of a externally guided sliding roof and then a louvered roof which is comprised of a plurality of cover parts 5, 6, 7, 8, and 9. The externally guided sliding roof and the louvered roof are bordered laterally by side members 2.

Figure 3:
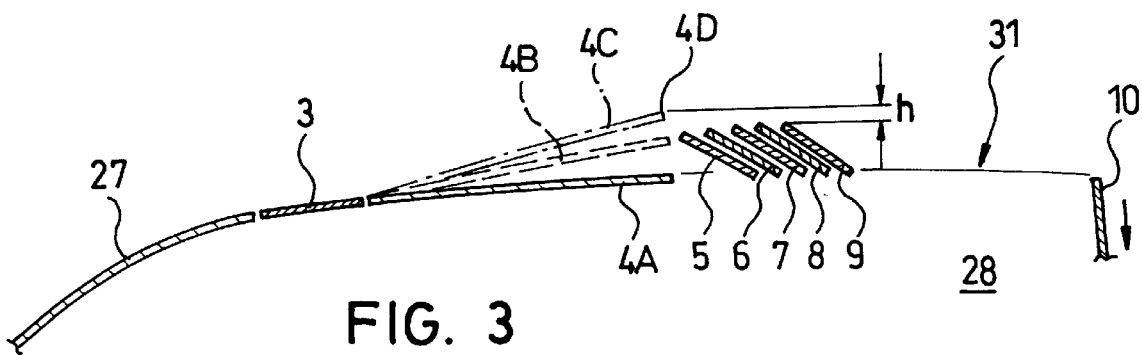
FIG. 3 shows a schematic lengthwise section through the motor vehicle roof with the louvered roof opened and the front cover raised.
Figure 4:
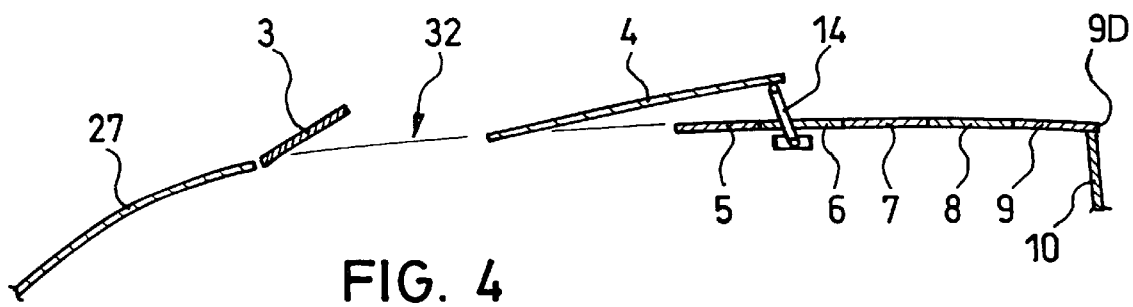
FIG. 4 shows a schematic lengthwise section through the motor vehicle roof with the front cover partially opened, the wind deflector louver raised, and the louvered roof closed.

The rear edge 4D of the cover 4, in the closed state, seamlessly borders either the front edge of the first louver-like cover part 5 as in FIGS. 3 & 4, or a narrow area 29 of the fixed motor vehicle roof 1, which is made as a transverse bow, as in FIG. 1. When the cover 4 and the cover part 5 adjoin one another seamlessly, the two can also be underpinned by a transverse bow 35 (see FIG. 5) in the area where they meet, by which the stability of the motor vehicle roof is increased.

The rear edge 9D of the rear cover part 9 directly adjoins the top edge of the rear window 10 (FIG. 4) which is supported to be lowerable in the rear door or rear hatch.

Figure 2:
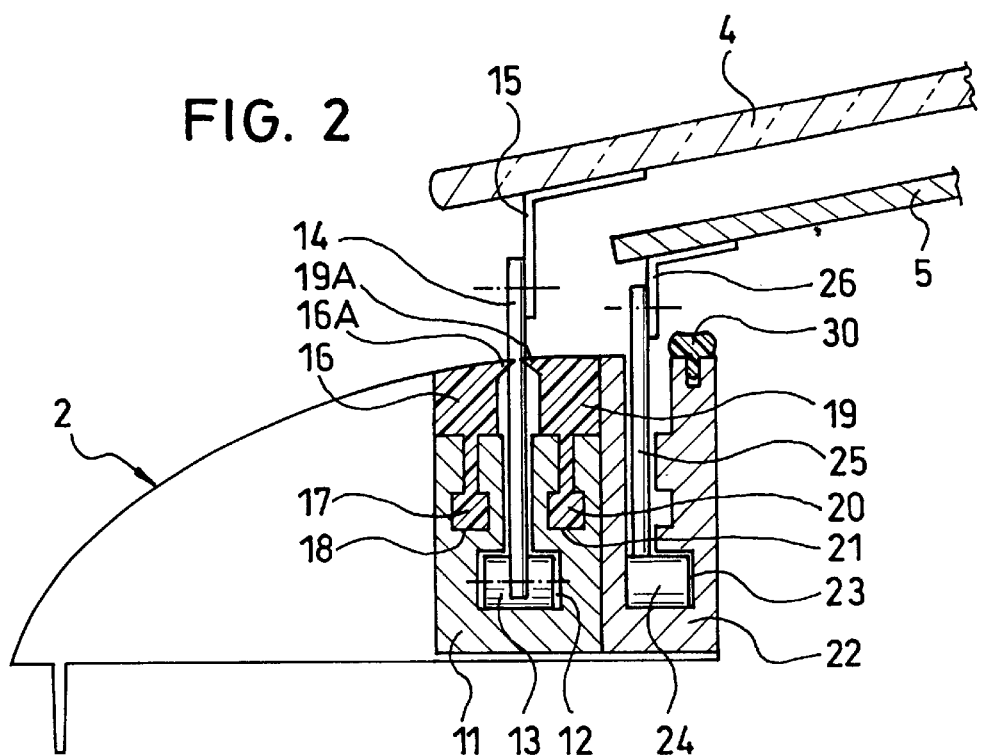
FIG. 2 shows a cross section through the guides in the area of the left side member.

As is shown in FIG. 2, in the area of its rear edge 4D, the cover 4 of the externally guided sliding roof is supported on each side by a support lever 14 in the raised state. The lower end of the support lever 14 is pivotally mounted on a sliding element 13 which is guided to move lengthwise in a guide channel 12. The guide channel 12 is formed in a guide rail 11 which is supported on the side member 2. The support lever 14 is joined to the cover 4 by means of a support angle 15. The guide channel 12 is upwardly opened for the emergence of the support lever 14 and is covered, with the cover 4 closed, by two sealing elements 16, 19.

The sealing element 16 is attached with an inserted foot 17 in a receiving groove 18 in the guide rail 11. On the top inner edge of the sealing element 16, there is a sealing lip 16A which interacts with a sealing lip 19A on the sealing element 19 such that the two sealing lips 16A and 19A, with the cover 4 closed and the support lever 14 lowered, tightly adjoin one another and completely cover the guide channel 12 to the top. When the rear edge 4D of the cover 4 is raised, the support lever 14 assumes its support function and thus emerges upwardly past the sealing lips 16A and 19A to above the fixed motor vehicle roof 1. The sealing lips thus diverge to the side and conform to the support lever 14.

Viewed from the side member 2 toward the inside, the guide rail 11 adjoins a guide rail 22, in the guide channel 23 of which a guide crank 25 for actuating the cover part 5 is supported on a slide element 24 to move lengthwise. The cover part 5 is joined to the cover crank 25 by means of a support angle 26. The cover part 5 is sealed relative to the roof opening by means of a sealing element 30 which is attached on top of an inside vertical bridge of the guide rail 22.

In FIG. 3, the louvered roof with the cover parts 5, 6, 7, 8, 9 is completely opened, the cover parts being moved from back to front. In this way, the rear roof opening 31 is completely cleared. With the simultaneous lowering of the rear window 10 into the rear door or the rear hatch, a loading opening is created which comprises not only the rear roof area, but also the top part of the rear motor vehicle covering (rear door).

The louvered roof which is pushed together to the front as a package is effectively protected against the oncoming airstream by the cover 4 which can be raised in several intermediate stages 4B as far as the completely raised position 4C. The position of the rear edge 4D of the cover 4 in the completely raised state is higher by a height difference h than the top edge of the louver-like cover parts. In this way, the airstream is guided completely over the package of the louvered roof. The rear roof opening 31 is thus also effectively protected against the draft.

For the opening state which is shown in FIG. 4, the louvered roof is completely closed. Conversely, the cover 4 of the externally guided sliding roof is raised at its rear edge, the function of the support lever 14 implemented at the same time. The cover 4 can be moved completely to the rear over the louvered roof to expose the front roof opening 32. This is possible because the guide rails 11 for the cover 4 or the support lever 14 are located laterally outside the guide rails 22 of the louvered roof.

To protect the front roof opening 32 likewise against the draft, with the cover 4 opened, the wind deflector louver 3 is raised.

Figure 5:
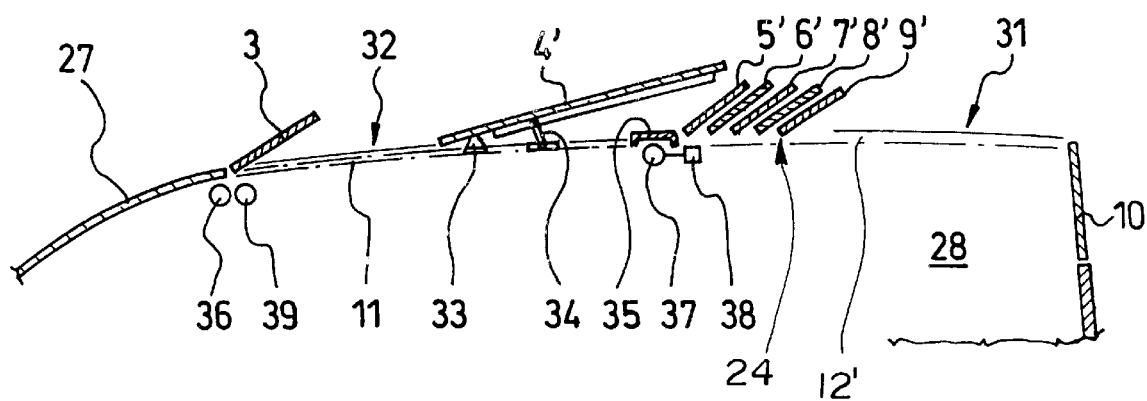
FIG. 5 shows a schematic lengthwise section through an alternative embodiment of a motor vehicle roof with the wind deflector louver raised, with a front spoiler roof cover partially opened, and with the louvered roof opened, the louvers with their rear edge being tilted to the rear at the top.

In the embodiment shown in FIG. 5, the front window 27 adjoins a raisable wind deflector louver 3. The cover 4' which is behind the deflector louver 3 is made in the manner of the cover of a spoiler roof, in contrast to the above described embodiments. The cover 4', near its front edge, is pivotally coupled to a slide element 33 and can be raised at its rear edge by means of a raising lever 34 which can be moved to the rear in this swung-out position for partial exposure of the front roof opening 32. In doing so, the displacement of the cover 4' to the rear is then additionally limited when the frontmost louver-like cover part 5' of a louvered roof which is located behind cover 4' and which comprises other louver-like cover parts 6', 7', 8' and 9' is swung into a raised position. The rear louvered roof system with the cover parts 5', 6', 7', 8' and 9' likewise opens from back to front, the rear edges of the cover parts, in contrast to those of FIG. 3, being inclined upwardly toward the rear. Because the slide elements 33 and the lower support point of the raising lever 34 are moved in the same guide rails, like the slide elements of the cover parts 5', 6', 7', 8' and 9', two guide systems which are located laterally next to one another, as shown in FIG. 2, are not necessary, only one guide channel 12, 12' being sufficient. The cover parts 5', 6', 7', 8' and 9' can thus also be guided further to the outside and can have the same width as the front cover 4'. In this way, the front roof opening 32 and the rear roof opening 31 have the same width; this has an advantageous effect on the visual esthetics of the motor vehicle, both with the roof closed and also with the roof opened.

Figure 6:
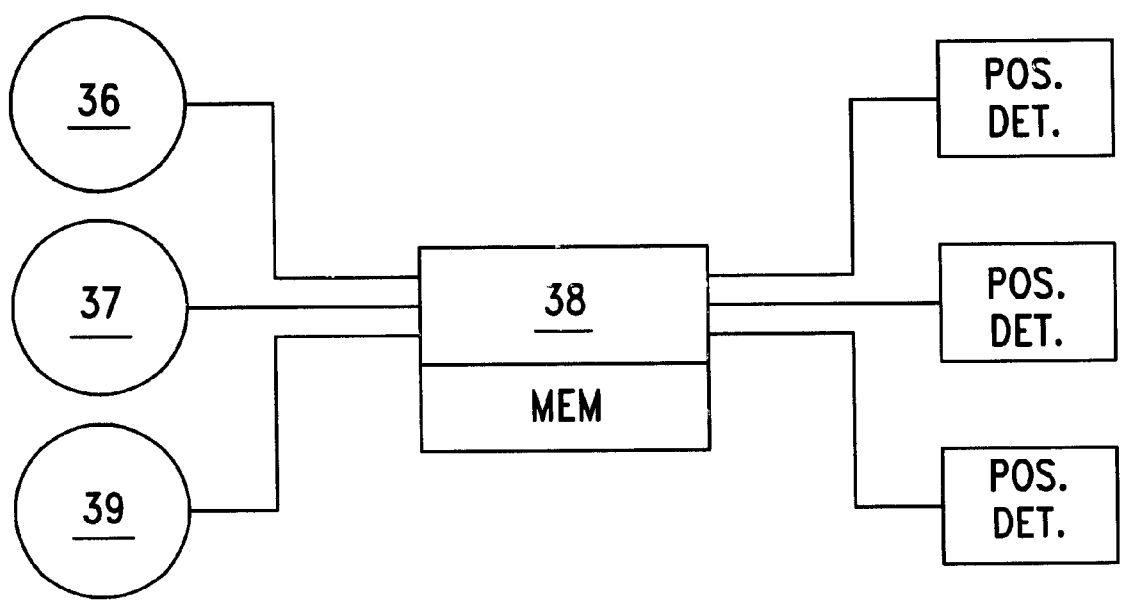
FIG. 6 shows a schematic block diagram of the drivers, control device and position detectors of the present roof system.

Furthermore, FIG. 5 shows an electric drive 36 for the front cover 4 or 4' which is drive-connected to the slide element 33 or to the lower coupling point of the raising lever 34 via drive cables (not shown) and which are guided to be resistant to compression and tension. In the area of the transverse bow 35, there is another drive 37 which is drive-connected in the same way to the cover parts 5', 6', 7', 8' and 9'. Even if the drives are only schematically depicted in FIG. 5, it is clear to one skilled in the art that these drives 36 and 37 are also suitable for the front cover 4 and the cover parts 5, 6, 7, 8, and 9 of the embodiment as shown in FIGS. 1 and 4. The drives 36 and 37 can also be located both in the area of the transverse bow 35 and the area 29 of the fixed motor vehicle roof or forward in the area of the wind deflector louver 3 or one part or both drives are located behind in the area of the cargo space 28. Referring to FIGS. 5 and 6, the drives 36, 37, and optionally another drive 39 for actuating the wind deflector louver 3, are advantageously linked by a common control device 38 which has position detectors that recognize the respective position of the cover 4, 4' or of the cover parts 5, 6, 7, 8, 9 or 5', 6', 7', 8', 9' and the wind deflector louver 3, and has stored preferable programs, by which the position of the other elements is matched to certain positions and the entire system provides for optimum ventilation with the minimum possible noise and draft annoyance. The control device 38, therefore, in addition to the function of preventing collision of the movable roof elements (wind deflector louver 3, cover 4, 4' and cover parts 5, 6, 7, 8, 9 or 5', 6', 7', 8', 9') also has the task of moving them into preferred positions relative one another.

The motor vehicle roof described combines, in an outstanding manner, the advantages of a known raisable sliding roof with those of a louvered roof for the special purpose of creating a rear cargo space opening comparable to that existing at the rear of a pickup truck.

What is claimed is:

1. Openable roof of a motor vehicle comprising a roof surface a front roof opening over a driver's area, a rear roof opening extending substantially from a rear end of a cargo space to the front roof opening in which at least two successive, separately openable roof systems are provided, a front roof system which has at least one cover which is raisable above the level of the roof surface, and a rear roof system which is formed by a louvered roof having a plurality of louver-shaped cover parts, a rearmost cover part of which lies over a rear area of a cargo space of the motor vehicle and the cover parts being displaceable in an opening direction from rear to front.

2. Motor vehicle roof as claimed in claim 1, wherein a rear edge of the rearmost cover part directly adjoins one of a rear hatch, a rear door, and a rear window of the motor vehicle.

3. Motor vehicle roof as claimed in claim 1, wherein a rear edge of the cover of the front roof system, in a completely raised state, is higher than the cover parts of the rear roof system in a fully open position.

4. Motor vehicle roof as claimed in claim 1, wherein one of a) a narrow transversely extending area of a fixed roof surface is located between the front and rear roof systems, and b) the rear edge of the front roof system in the closed state seamlessly borders the front edge of the rear roof system.

5. Motor vehicle roof as claimed in claim 1, wherein the front roof system is a externally guided sliding roof with a cover which is supported near a rear edge by support levers which have bottom ends which are supported on sliding elements which are movable on guides which lie laterally outside the guides for the louver-shaped cover parts of the rear roof system.

6. Motor vehicle roof as claimed in claim 1, wherein the front roof system is a spoiler roof with a cover which is pivotally coupled near a front edge thereof to a slide element and is supported rearwardly by raising levers which have bottom ends supported on slide elements; and wherein said slide elements are movable in guides which also guide the louver-shaped cover parts of the rear roof system.

7. Motor vehicle roof as claimed in claim 1, wherein the front and the rear roof systems are driven via separate electric drives which are triggerable by a common control device, such that the cover of the front roof system is movable to a limited degree in the lengthwise direction as soon as the rear roof system has reached a pre-defined degree of partial opening.

8. Motor vehicle roof as claimed in claim 1, wherein a control device is provided for moving the cover of the front roof system into a raised position as soon as the control device receives a signal for indicating that the rear roof system has achieved at least a pre-defined degree of partial opening.

9. Motor vehicle roof as claimed in claim 1, wherein a wind deflector louver is located in front of the front roof system, said wind deflector being movable into a raised position as soon as the cover of the front roof system has reached at least a pre-defined degree of partial opening.

* * * * *